United States Patent Office 3,250,153
Patented May 10, 1966

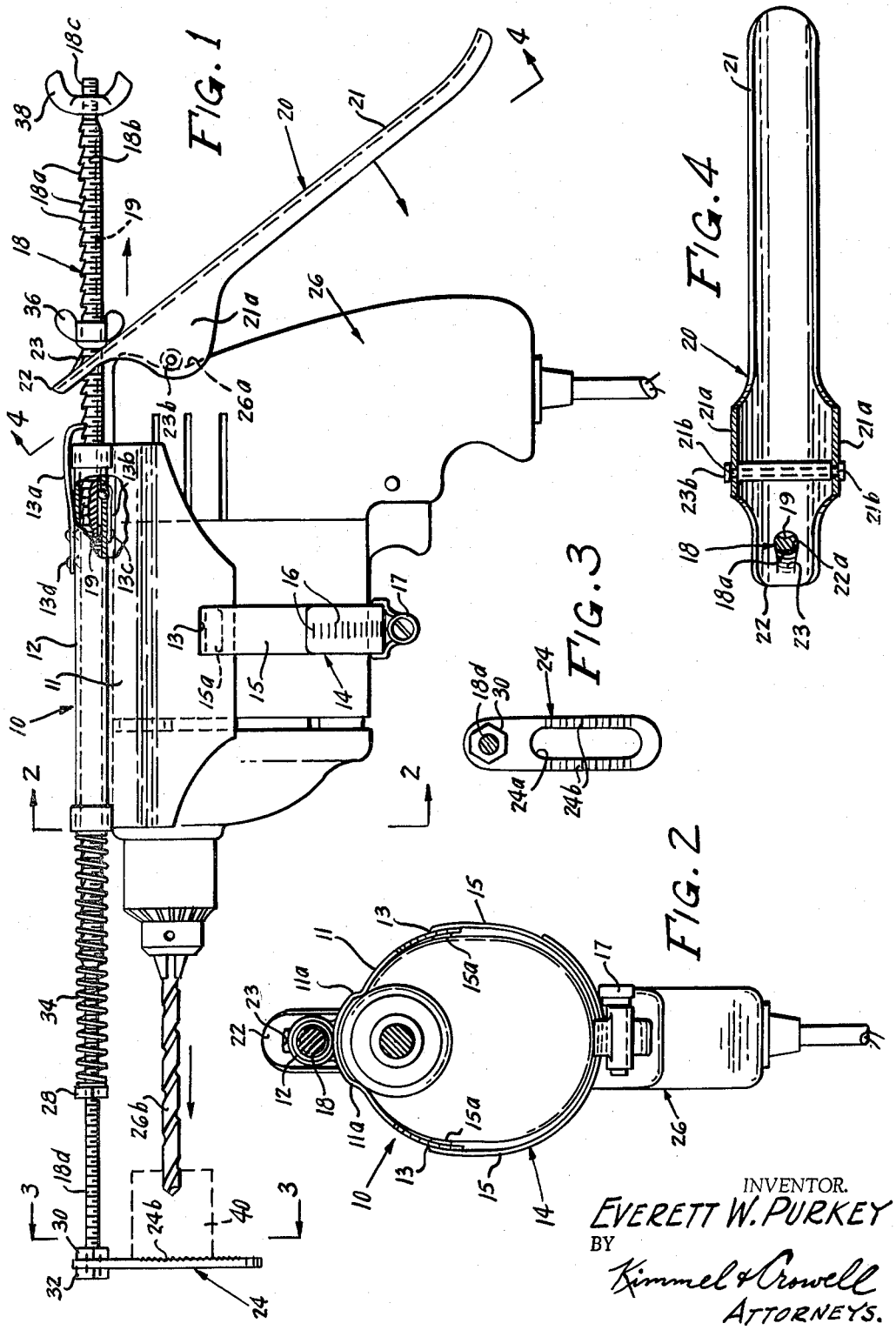

3,250,153
PORTABLE DRILL PRESS
Everett W. Purkey, 1716 Hammon Ave.,
Oroville, Calif.
Filed Jan. 27, 1964, Ser. No. 340,254
12 Claims. (Cl. 77—7)

This invention relates to a drill press, and in particular, to a light, simple, and inexpensive device for quickly converting a hand drill into a drill press of a portable nature which is adapted to be used in confined spaces in various positions and with different shapes of work material.

Many craftsmen, metal workers, contractors and the like in the fabrication and installation of light metal shapes on the job, such as, aluminum storm windows, jalousies and repair work find a great need for a compact, simple, light and inexpensive drill press device which will fit compactly into an ordinary tool box and be readily available for quickly converting a portable electric hand drill into a suitable drill press adaptable to be used in confined spaces and grip various shapes of work material securely.

The instant invention quickly and efficiently solves all of the above problems and assures a construction worker that he has a flexible tool adaptable to solve the needs of the most unusual installation or repair situation to be found on different jobs.

The primary object of this invention is to provide an attachment which will quickly convert a conventional electric hand drill into a light simple and economical portable drill press adaptable to successfully perform drilling operations accurately, rapidly and with a minimum of effort on the part of the operator.

Another object of this invention is to provide a light and portable drill press which has a drilling depth gauge adjustment thereon.

A further object of the present invention is to provide a compact drill press attachment which is properly aligned with a hand drill to perform accurate work during drilling operations.

A still further object of the instant invention is to provide a light and rugged drill press attachment for a portable hand drill which is adapted to be used in confined spaces in various positions and with different shapes of work material.

Another object of this invention is to provide a drill press attachment for a portable hand drill of such structure as will fit conveniently into a common tool box.

Other objects and many of the attendant advantages of the instant invention will be readily appreciated as the same becomes better understood by reference to the following detailed description when considered in connection with the accompanying drawing, in which like reference numerals designate like parts throughout the figures thereof and wherein:

FIGURE 1 is a longitudinal side and part sectional view of the invention installed on a conventional portable electrical hand drill;

FIGURE 2 is a partial sectional end view of FIGURE 1 taken on lines 2—2 in the direction of the arrows;

FIGURE 3 is a partial sectional view of the work support of FIGURE 1 taken on lines 3—3 in the direction of the arrows; and FIGURE 4 is a part sectional view of the feed rod and handle mechanisms of FIGURE 1 taken on lines 4—4 in the direction of the arrows.

Referring to the drawings in more detail, FIGURES 1, 2, 3, and 4 show an exemplary embodiment of the invention, which comprises generally a securing clamping saddle means 10, clamping ring structure 14, a feed rod support means 18, handle means 20 adjustably carried by feed rod structure 18 which carries at its distal end work support means 24.

Saddle means 10 comprises an arcuate and substantially semi-circular body means 11 supporting a tubular bearing means 12, slot means 13, spring detent means 13a and rivet means 13d, ball bearing detent means 13b, spring retaining means 13c welded to bearing means 11. Body means 11 comprises a composite curve means 11a adapted to receive and securely engage the body portion of electrical drill means 26.

Clamping ring structure 14 comprises side partial ring members 15, having hook members 16 to engage slot means 13 in saddle means 10. The lower ends of side members 15 are comprised of partial serrated thread means 16 adapted to be adjustably tightened by a screw engaging means 17 surrounding the thread means 16. Screw engaging means 17 is of a commercial type similar to a well known garden hose connecting and fastening means or may be of another clamping and bolt type, if desired.

Feed rod means 18 is comprised of drill feeding or advancing notch means 18a, threaded portions 18b, 18c and 18d and longitudinal groove means 19.

Handle means 20 is comprised of an arcuate longitudinal hand grip portion 21, oppositely disposed side portions 21a having aperture means 21b and an extending top portion 22 having an aperture means 22a and a rigid backwardly extending tongue portion 23 adapted to engage notch means 18a as a feeding means on rod means 18 to advance work 40 toward drill bit means 26b. Aperture means 21b is adapted to rotatably receive pin means 23b which engages a recessed back portion 26a of the hand grip of the electrical hand drill means 26.

The present invention may be assembled by adjustably screw thread nut means 28 and 30 on threaded portion 18d of support rod means 18, passing support rod means 18 through a circular opening in work support means 24 and rigidly securing support rod means 18 to work support means 24 by nut means 32.

Work support means 24 includes a slotted aperture means 24a for clearance of the drill bit means 26b passing therethrough and a serrated friction biting and gripping means 24b adapted to frictionally engage and securely hold various kinds of work material thereon during a drilling operation. The spring means 34 may be mounted on support rod means 18 against screw thread nut means 28 and support rod means 18 is adjustably passed through tubular bearing means 12 of saddle means 10 to engage spring means 34, such that spring detent means 13a is aligned with and engages notch means 18a and ball bearing detent means 13b engages longitudinal slot means 19 of support rod means 18 to function as a guide means. Support rod means 18 is then passed through aperture means 22a of handle means 20 and aligned so that tongue means 23 of handle means 20 engages notch means 18a of support rod means 18. The screw wing nut means 36 and 38 are engaged with threaded portions 18b and 18c, respectively of support rod means 18. Wing nut means 36 is then adjusted so that handle means 20 and pin means 23b may properly contact recess means 26a of electric drill means 26, after which, saddle means 10 is placed on the body part of drill means 26 and side ring means 15 having hook means 15a are passed through slot means 13 of saddle means 10 and rigidly secured around drill means 26 by tightening screw means 17 engaging partially formed serrated thread means 16 of members 15 of clamping ring structure 14, as best shown in FIGURES 1 and 2, after which the drill press of the instant invention is in proper alignment with electrical drill means 26 for various drilling operations.

During operation, a desired piece of work material 40 is placed on work support means 24 and drill bit 26b is lowered or advanced forward by pressing handle means 20 to adjust support rod means 18 to allow drill bit 26b to engage work material 40 during a drilling operation. During operation of handle means 20, pin means 23b serves as a fulcrum means for handle means 20. During a drilling operation, ball bearing detent means 13b engages an aligning slot means 19 of support rod means 18 for proper alignment of drill means 26 with work material 40, and spring detent means 13a engages notch means 18a to prevent inadvertent withdrawal of support rod means 18. Wing nut means 36 serves as a depth gauge drilling means depending on the limits of travel of catch means 23 of handle means 20 engaging a selected notch means 18a adjacent wing nut means 36 during one sustained pressure operation of handle means 20 by an operator during drilling work. By proper adjustment of nut means 28, 30, 32, and wing nut means 36 instant invention is adapted to be adjusted to various sizes of work material in depth gauge or straight through drilling operations of various types of work materials. Spring means 34 is adjusted by nut means 28 for proper tension operation of handle means 20 by the ends of spring means 34 engaging nut means 28 and front end of tubular bearing means 12 of saddle means 10.

From the foregoing it will now be seen that there is herein provided a new and improved portable drill press attachment for a conventional electrical hand drill which accomplishes all the objects of this invention, and others, including many advantages of great practical utility and commercial importance.

It is to be understood, of course, that the foregoing disclosure relates to a preferred embodiment of the invention as illustrated, that various modifications and changes may be made in the invention by those skilled in the art without departing from the spirit and scope of the invention as set forth in the appended claims.

I claim:

1. A portable drill press adapted to be mounted on a conventional electrical hand drill comprising a saddle means including tubular bearing means, ring means and tightening screw means adapted to be aligned with and secured to an electrical hand drill, support rod means reciprocably secured in said tubular bearing means, work holder means fixedly aligned and secured to the forward end of said support rod means, aligning detent means comating with said support rod means, handle means attached to said support rod means and spring bias means operably interconnecting said handle means to said support rod means during a drilling operation.

2. A portable drill press as in claim 1, wherein said support rod means includes a screw thread nut adjustment means to adapt said drill press to depth gauge drilling operations.

3. A portable drill press as in claim 2, wherein said handle means includes fulcrum pin means to comate with a recess of the hand grip means of an electrical hand drill.

4. A portable drill press as in claim 3, wherein said work holder means includes elongated slot means therein and serrated friction engaging gripping means thereon to securely hold work material thereon during drilling operations.

5. A portable drill press as in claim 4, wherein said aligning detent means comprises a ball detent means in said tubular bearing means comating with an elongated groove means in said support rod means.

6. A portable drill press as in claim 5 comprising demountable handle means and work holder means to adapt said drill press to be enclosed in an ordinary tool box.

7. A portable drill press adapted to be mounted on a conventional electrical hand drill comprising a central saddle member means having a tubular bearing means thereon and an arcuate saddle portion adapted to fixedly receive the central body contour portion of an electrical hand drill, a support rod means aligned with, and reciprocably supported in, said tubular bearing means, a handle means adjustably secured to said support rod means and adapted to be fulcrumed against the hand grip portion of an electrical hand drill, and a work holder means adjustably carried by said support rod means to engage work material during drilling operations thereof.

8. A portable drill press as in claim 7 including spring bias reciprocating means carried by said support rod means coacting with said tubular bearing means to control tension on said handle means during operation.

9. A portable drill press as in claim 8, wherein said support rod means includes a screw thread nut adjustment means to adapt said drill press to depth gauge drilling operations.

10. A portable drill press as in claim 9, comprising demountable handle means and work holder means to adapt said drill press to be enclosed in an ordinary tool box.

11. A portable drill press as in claim 10, comprising aligning detent means including ball detent means in said tubular bearing means comating with an elongated slot means in said support rod means.

12. A portable drill press as in claim 11, wherein said work holder means includes elongated slot means therein aligned with a drill bit and serrated friction engaging gripping means thereon to securely hold work material thereon during drilling operations.

References Cited by the Examiner

UNITED STATES PATENTS 2,440,852   5/1948   Elford _____ 77—7
2,466,965   4/1949   Pitts _____ 77—7

WILLIAM W. DYER, Jr., *Primary Examiner.*

FRANCIS S. HUSAR, *Examiner.*